(12) United States Patent
Sztuk et al.

(10) Patent No.: US 9,952,666 B2
(45) Date of Patent: *Apr. 24, 2018

(54) SYSTEMS AND METHODS OF EYE TRACKING CONTROL ON MOBILE DEVICE

(71) Applicant: Facebook, Inc., Menlo Park, CA (US)

(72) Inventors: Sebastian Sztuk, Copenhagen N. (DK); Martin Henrik Tall, Frederiksberg C. (DK); Javier San Agustin Lopez, Copenhagen S. (DK)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,727

(22) Filed: Mar. 8, 2017

(65) Prior Publication Data
US 2017/0177081 A1 Jun. 22, 2017

Related U.S. Application Data

(63) Continuation of application No. 14/089,609, filed on Nov. 25, 2013, now Pat. No. 9,612,656.
(Continued)

(51) Int. Cl.
*G06F 3/01* (2006.01)
*G06K 9/00* (2006.01)
(Continued)

(52) U.S. Cl.
CPC .......... *G06F 3/013* (2013.01); *G06K 9/0061* (2013.01); *G06K 9/00604* (2013.01); *G06T 7/74* (2017.01);
(Continued)

(58) Field of Classification Search
CPC ........ G06F 3/013; G06F 3/0481; G06F 3/005; G06F 2203/04805; G06K 9/00604; G06K 9/2027
See application file for complete search history.

(56) References Cited

U.S. PATENT DOCUMENTS

| 4,772,885 A | 9/1988 | Uehara et al. |
| 4,973,149 A | 11/1990 | Hutchinson |

(Continued)

FOREIGN PATENT DOCUMENTS

| CN | 101282680 A | 10/2008 |
| CN | 100589752 C | 2/2010 |

(Continued)

OTHER PUBLICATIONS

"DynaVox Announces the EyeMax: New Eye Gaze System Provides Greater Independence", [Online]. Retrieved from the Internet: <URL: http://www.dynavoxtech.com/company/press/release/detail.aspx?id=11>, (Aug. 6, 2008), 2 pgs.

(Continued)

*Primary Examiner* — Shaheda Abdin
(74) *Attorney, Agent, or Firm* — Fenwick & West LLP (57) ABSTRACT

Methods and systems to facilitate eye tracking control on mobile devices are provided. An image of a portion of a user is received at an eye tracking device, where the image includes reflections caused by light emitted on the user from one or more light sources located within the eye tracking device. One or more eye features associated with an eye of the user is detected using the reflections. Point of regard information is determined using the one or more eye features, where the point of regard information indicates a location on a display of a computing device coupled to the eye tracking device at which the user was looking when the image of the portion of the user was taken. The point of regard information is sent to an application capable of performing a subsequent operation using the point of regard information.

16 Claims, 8 Drawing Sheets

Related U.S. Application Data (60) Provisional application No. 61/730,407, filed on Nov. 27, 2012.

(51) Int. Cl.
  *G06T 7/73* (2017.01)
  *G02B 5/20* (2006.01)

(52) U.S. Cl.
  CPC .... *G02B 5/208* (2013.01); *G06T 2207/10048* (2013.01); *G06T 2207/30201* (2013.01)

(56) References Cited

U.S. PATENT DOCUMENTS

| | | | |
|---|---|---|---|
| 5,218,387 A | 6/1993 | Ueno et al. | |
| 5,293,427 A | 3/1994 | Ueno et al. | |
| 5,360,971 A | 11/1994 | Kaufman et al. | |
| 5,481,622 A | 1/1996 | Gerhardt et al. | |
| 5,638,176 A | 6/1997 | Hobbs et al. | |
| 5,649,061 A | 7/1997 | Smyth | |
| 5,748,371 A | 5/1998 | Cathey et al. | |
| 5,835,083 A | 11/1998 | Nielsen et al. | |
| 5,963,300 A | 10/1999 | Horwitz | |
| 6,082,858 A | 7/2000 | Grace et al. | |
| 6,152,371 A | 11/2000 | Schwartz et al. | |
| 6,152,563 A | 11/2000 | Hutchinson et al. | |
| 6,162,186 A | 12/2000 | Scinto et al. | |
| 6,204,828 B1 | 3/2001 | Amir et al. | |
| 6,320,610 B1 | 11/2001 | Van Sant et al. | |
| 6,323,884 B1 | 11/2001 | Bird et al. | |
| 6,351,273 B1 | 2/2002 | Lemelson et al. | |
| 6,377,284 B1 | 4/2002 | Lentz et al. | |
| 6,421,064 B1 | 7/2002 | Lemelson et al. | |
| 6,478,425 B2 | 11/2002 | Trajkovic et al. | |
| 6,526,159 B1 | 2/2003 | Nickerson | |
| 6,577,329 B1 | 6/2003 | Flickner et al. | |
| 6,643,721 B1 | 11/2003 | Sun | |
| 6,704,034 B1 | 3/2004 | Rodriguez et al. | |
| 7,013,258 B1 | 3/2006 | Su et al. | |
| 7,202,793 B2 | 4/2007 | Grace et al. | |
| 7,487,461 B2 | 2/2009 | Zhai et al. | |
| 7,513,620 B2 | 4/2009 | Dai et al. | |
| 7,572,008 B2 | 8/2009 | Elvesjo et al. | |
| 7,657,062 B2 | 2/2010 | Pilu | |
| 7,808,587 B2 | 10/2010 | Shirasaka et al. | |
| 7,963,652 B2 | 6/2011 | Vertegaal et al. | |
| 8,066,375 B2 | 11/2011 | Skogö et al. | |
| RE42,998 E * | 12/2011 | Teiwes | A61B 3/113 351/206 |
| 8,120,577 B2 | 2/2012 | Bouvin et al. | |
| 8,185,845 B2 | 5/2012 | Bjorklund et al. | |
| 8,220,926 B2 | 7/2012 | Blixt et al. | |
| 8,235,529 B1 | 8/2012 | Raffle et al. | |
| 8,314,707 B2 | 11/2012 | Kobetski et al. | |
| 8,562,136 B2 | 10/2013 | Blixt et al. | |
| 2002/0036617 A1 | 3/2002 | Pryor | |
| 2002/0070965 A1 | 6/2002 | Austin | |
| 2002/0070966 A1 | 6/2002 | Austin | |
| 2002/0070968 A1 | 6/2002 | Austin et al. | |
| 2002/0075384 A1 | 6/2002 | Harman | |
| 2002/0105482 A1 | 8/2002 | Lemelson et al. | |
| 2002/0180801 A1 | 12/2002 | Doyle et al. | |
| 2003/0038754 A1 | 2/2003 | Goldstein et al. | |
| 2003/0123027 A1 | 7/2003 | Amir et al. | |
| 2003/0179314 A1 | 9/2003 | Nozaki | |
| 2004/0001100 A1 | 1/2004 | Wajda | |
| 2004/0005083 A1 * | 1/2004 | Fujimura | A61B 3/113 382/103 |
| 2004/0061831 A1 | 4/2004 | Aughey et al. | |
| 2004/0073827 A1 | 4/2004 | Tsirkel et al. | |
| 2004/0213463 A1 | 10/2004 | Morrison | |
| 2005/0047629 A1 | 3/2005 | Farrell et al. | |
| 2005/0050686 A1 | 3/2005 | Kurokawa | |
| 2005/0100191 A1 | 5/2005 | Harbach et al. | |
| 2005/0110887 A1 | 5/2005 | Shin et al. | |
| 2005/0119642 A1 | 6/2005 | Grecu et al. | |
| 2005/0199783 A1 | 9/2005 | Wenstrand et al. | |
| 2005/0243054 A1 | 11/2005 | Beymer et al. | |
| 2005/0289363 A1 | 12/2005 | Tsirkel et al. | |
| 2006/0047386 A1 | 3/2006 | Kanevsky et al. | |
| 2006/0093998 A1 | 5/2006 | Vertegaal | |
| 2006/0120599 A1 | 6/2006 | Steinberg et al. | |
| 2006/0238707 A1 | 10/2006 | Elvesjo et al. | |
| 2006/0239670 A1 | 10/2006 | Cleveland | |
| 2007/0078552 A1 * | 4/2007 | Rosenberg | G06F 1/1626 700/94 |
| 2007/0122140 A1 | 5/2007 | Ito et al. | |
| 2007/0159599 A1 | 7/2007 | Yamada | |
| 2007/0164990 A1 | 7/2007 | Bjorklund et al. | |
| 2007/0230933 A1 | 10/2007 | Sugimoto et al. | |
| 2007/0282506 A1 | 12/2007 | Breed et al. | |
| 2008/0079687 A1 | 4/2008 | Cernasov | |
| 2008/0122792 A1 | 5/2008 | Izadi et al. | |
| 2008/0284980 A1 | 11/2008 | Skogo et al. | |
| 2008/0297614 A1 | 12/2008 | Lieberman et al. | |
| 2009/0027336 A1 | 1/2009 | Lin et al. | |
| 2009/0067680 A1 | 3/2009 | Dowski et al. | |
| 2009/0073128 A1 | 3/2009 | Marsden | |
| 2009/0073142 A1 | 3/2009 | Yamashita et al. | |
| 2009/0103048 A1 | 4/2009 | Tsukiji | |
| 2009/0125849 A1 | 5/2009 | Bouvin et al. | |
| 2009/0179853 A1 | 7/2009 | Beale | |
| 2009/0251407 A1 | 10/2009 | Flake et al. | |
| 2009/0263012 A1 | 10/2009 | Georgis et al. | |
| 2009/0273562 A1 | 11/2009 | Baliga et al. | |
| 2010/0066975 A1 | 3/2010 | Rehnstrom | |
| 2010/0077421 A1 | 3/2010 | Cohen et al. | |
| 2010/0079508 A1 | 4/2010 | Hodge et al. | |
| 2010/0195881 A1 | 8/2010 | Orderud et al. | |
| 2010/0205667 A1 | 8/2010 | Anderson et al. | |
| 2010/0262281 A1 | 10/2010 | Suzuki et al. | |
| 2010/0272363 A1 | 10/2010 | Steinberg et al. | |
| 2011/0013007 A1 | 1/2011 | Holmberg et al. | |
| 2011/0029918 A1 | 2/2011 | Yoo et al. | |
| 2011/0051239 A1 | 3/2011 | Daiku | |
| 2011/0170061 A1 * | 7/2011 | Gordon | A61B 3/113 351/206 |
| 2011/0304706 A1 | 12/2011 | Border et al. | |
| 2012/0105486 A1 * | 5/2012 | Lankford | G06F 3/013 345/661 |
| 2012/0105490 A1 | 5/2012 | Pasquero et al. | |
| 2012/0272179 A1 | 10/2012 | Stafford | |
| 2012/0319972 A1 | 12/2012 | Tse et al. | |
| 2012/0327101 A1 | 12/2012 | Blixt et al. | |
| 2013/0076885 A1 | 3/2013 | Kobetski et al. | |
| 2013/0106681 A1 | 5/2013 | Eskilsson et al. | |
| 2013/0107214 A1 | 5/2013 | Blixt et al. | |

FOREIGN PATENT DOCUMENTS

| | | |
|---|---|---|
| DE | 19731301 A1 | 1/1990 |
| DE | 4122752 A1 | 1/1993 |
| EP | 0 816 983 A2 | 1/1998 |
| EP | 1 114 608 A1 | 7/2001 |
| EP | 1 336 372 A2 | 8/2003 |
| EP | 1 679 577 A1 | 7/2006 |
| EP | 2 037 352 A2 | 3/2009 |
| EP | 2 581 034 A1 | 4/2013 |
| JP | 682680 A | 3/1994 |
| JP | 9211310 A | 8/1997 |
| JP | 10221016 A | 8/1998 |
| JP | 2000137792 A | 5/2000 |
| JP | 2011081807 A | 4/2011 |
| JP | 2011115606 A | 6/2011 |
| JP | 5297486 B2 | 9/2013 |
| KR | 10-2008-0106218 A | 12/2008 |
| KR | 10-2011-0124246 A | 11/2011 |
| WO | WO 99/27412 A1 | 6/1999 |
| WO | WO 01/52722 A1 | 7/2001 |
| WO | WO 2004/045399 A1 | 6/2004 |
| WO | WO 2004/090581 A2 | 10/2004 |
| WO | WO 2005/046465 A1 | 5/2005 |
| WO | WO 2006/016366 A2 | 2/2006 |
| WO | WO 2006/020408 A2 | 2/2006 |

(56) References Cited

FOREIGN PATENT DOCUMENTS

| WO | WO 2007/076479 A1 | 7/2007 |
| WO | WO 2007/085682 A1 | 8/2007 |
| WO | WO 2007/101690 A1 | 9/2007 |
| WO | WO 2008/056274 A1 | 5/2008 |
| WO | WO 2008/066460 A1 | 6/2008 |
| WO | WO 2009/022924 A1 | 2/2009 |
| WO | WO 2009/027773 A1 | 3/2009 |
| WO | WO 2009/101238 A1 | 8/2009 |
| WO | WO 2010/127714 A2 | 11/2010 |
| WO | WO 2011/089199 A1 | 7/2011 |
| WO | WO 2013/060826 A1 | 5/2013 |
| WO | WO 2013/102551 A1 | 7/2013 |

OTHER PUBLICATIONS

Talukder, Ashit, et al., "Real-time Non-Intrusive Eyetracking and Gaze-point Determination for Human Computer Interaction and Biomedicine", [Online]. Retrieved from the Internet: <URL: http://www.wseas.us/e-library/conferences/skiathos2002/papers/447-297.pdf>, (2002), 6 pgs.

United States Office Action, U.S. Appl. No. 14/089,609, dated Jun. 16, 2016, 16 pages.

United States Office Action, U.S. Appl. No. 14/089,609, dated Feb. 2, 2016, 12 pages.

United States Office Action, U.S. Appl. No. 14/089,609, dated Jul. 8, 2015, 10 pages.

* cited by examiner

SYSTEMS AND METHODS OF EYE TRACKING CONTROL ON MOBILE DEVICE

CROSS-REFERENCE TO RELATED APPLICATIONS

This application is a continuation of U.S. patent application Ser. No. 14/089,609, filed Nov. 25, 2013, which claims the benefit of Provisional Application No. 61/730,407, filed Nov. 27, 2012, both of which are incorporated herein by reference in their entirety.

TECHNICAL FIELD

The present disclosure generally relates to mobile devices and, more specifically, to systems and methods for facilitating eye tracking control on mobile devices.

BRIEF DESCRIPTION OF THE DRAWINGS

Some embodiments are illustrated by way of example and not of limitation in the figures of the accompanying drawings.

DETAILED DESCRIPTION

Example systems and methods to facilitate eye tracking control on mobile devices are described. In the following description, for purposes of explanation, numerous specific details are set forth in order to provide a thorough understanding of example embodiments. It will be evident, however, to one skilled in the art that the present technology may be practiced without these specific details.

A user of a mobile device may interact with and control objects and applications displayed on the mobile device through the user's eye movement. An image of the user's eyes and/or face, captured by a front-facing camera on or coupled to the mobile device, may be analyzed using computer-vision algorithms, such as, for example, eye tracking algorithms and gaze detection algorithms. For example, the captured images may be processed to extract information relating to one or more features of the user's eyes and/or face. The mobile device may then use the extracted information to determine the location of the user's eyes and estimate the location on the display at which the user is looking. For example, the mobile device may be able to estimate at which icon on the display the user is looking. The estimation of where the user is looking may be used to direct one or more objects, applications, and the like to perform a particular operation. For example, the user may direct and control the movement of an object on the screen depending on where the user is looking on the display of the mobile device, including controlling scrolling functions, the movement of objects in a virtual game, and the like.

Figure 1:
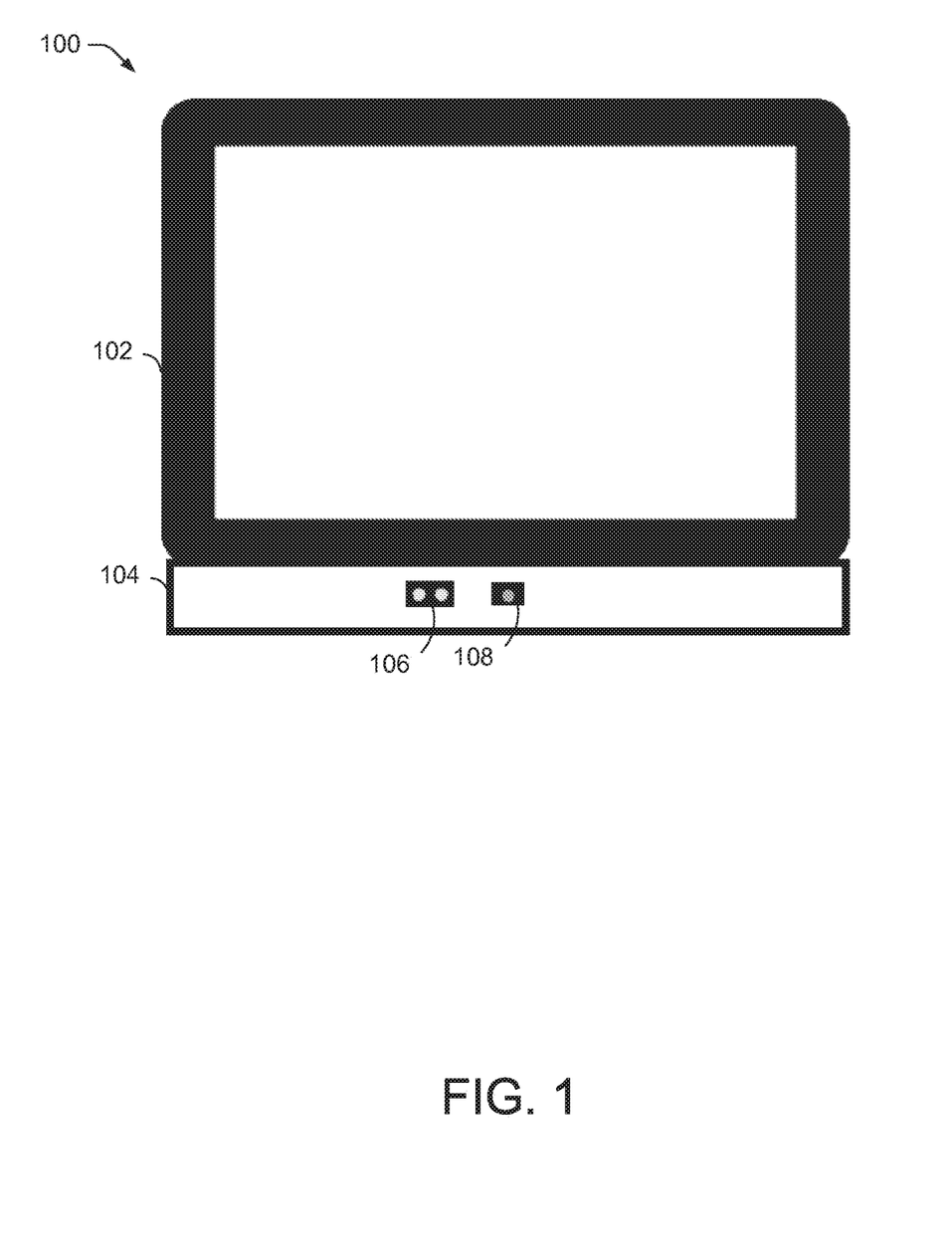
FIG. 1 is a device diagram of an example mobile device coupled to a docking device capable of facilitating eye tracking control, according to some embodiments.

FIG. 1 is a device diagram 100 of an example mobile device 102 coupled to a docking device 104 capable of facilitating eye tracking control. The mobile device 102 may be any type of mobile device, including, but not limited to, a smart phone, a personal digital assistant (PDA), a mobile phone, a computing tablet, an electronic reader, and the like. During eye tracking control, the mobile device 102 may be used by the user by holding the mobile device 102 with one hand, both hands, or while the mobile device 102 is on a stand.

A docking device 104 may be coupled to the mobile device 102 in any manner, such as through a USB port on the mobile device 102, micro USB port on the mobile device 102, and the like. While the docking device 104 of FIG. 1 is depicted at the bottom of the mobile device 102, one of ordinary skill in the art will appreciate that the docking device 104 may be located at any suitable location relative to the mobile device 102. The docking device 104 may include a camera module 108 and one or more light-emitting diodes (LEDs) 106. For explanatory purposes, LEDs 106 are depicted and described throughout the disclosure. However, one of ordinary skill in the art will appreciate that any appropriate light-emitting source may be used (e.g., infrared laser).

The docking device 104 may include any number of infrared LEDs 106 that may be placed in a suitable location in any manner within the docking device 104 (e.g., tilted at an angle such that it points toward the user's face). In some embodiments, the docking device 104 may have either three or six LEDs 106 (e.g., for batteries with voltage=5V). However, any number of LEDs and any arrangement may be used with or without voltage divider circuitry. In a specific embodiment, the one or more LEDs 106 may have any one or more of the following features or characteristics: 1 Watt or 3 Watts emitting at 850 nm, emitting light at approximately 30-40 degrees field of emission, placed in pairs (e.g., to bring the voltage level to an appropriate voltage (e.g., from 3.7V to 1.85V) based on the current the LEDs need), blinks in the same frequency as the camera records, and the like.

In some embodiments, the docking device 104 may also include a suitable type of infrared pass filter (e.g., active, mechanical, high-pass, band-pass, etc.). In some embodiments, a high-pass filter that blocks light below 800 nm and allows light above 800 nm is used. In some embodiments, the infrared pass filter may only allow light between 800-900 nm to enter the one or more cameras of the camera module 108.

The camera module 108 may include one or more front-facing cameras placed in any suitable location in any manner within the docking device 104 (e.g., tilted at an angle such that it points toward the user's face) and may be used to capture images of the user's eyes and/or face. The one or more cameras may be placed at an appropriate distance from the LEDs to optimize the proper capture of the infrared light. In some embodiments, a camera on the mobile device 102 is used in combination with camera module 108 in stereo mode. The camera module 108 may include any one or more of the following: a black and white (e.g., monochrome) or color (e.g., RGB) CMOS sensor, running at an appropriate frame per second rate (e.g., minimum high-definition at 30 frames per second), a lens without an infrared block filter and with an appropriate field of view (e.g., approximately 35 degrees) and depth of field (e.g., approximately 40-80 cm), and the like. The one or more cameras in the camera module 108 may be positioned such that the one or more cameras are tilted upward (e.g., toward a user's face).

The images captured by the camera may need to be rotated. The eye tracking software can use sensors on the mobile device 102 (e.g., accelerometer, magnetometer, etc.) to detect the orientation of the mobile device 102 and rotate the image accordingly so that it can be properly processed.

The LEDs 106 emit light that is focused and centered toward the eyes of the user. The infrared light from the LEDs 106 is reflected in the pupil and on the cornea of the user and recorded by the cameras in the camera module 108. The LEDs 106 may be synchronized with the one or more cameras so that the LEDs 106 are on only when the one or more cameras are grabbing an image. In some embodiments, to improve the image quality, the visible light below 800 nm is filtered out using an infrared pass filter. The field of view and depth of view of the lenses of the one or more cameras in the camera module 108 may allow the user to move around, thereby accommodating for head pose variance of the user. The eye tracking control software may analyze the images taken by the camera module 108 to provide x,y coordinates of where the user is looking on the display of the mobile device 102. The x,y coordinates may be used for any number of applications (e.g., scrolling, moving objects, selecting icons, playing games, etc.).

The LEDs 106 and the camera module 108 may be turned on and/or off in any manner, such as by utilizing an external slider, an on-off dedicated button on the side or on the back of either the mobile device 102 or the docking device 104, controlled by an application or a digital button on the screen, controlled by movement or shaking of the mobile device 102 and/or the docking device 104, controlled by voice commands, on-screen capacitive buttons, touch pad(s), bio-signals (e.g., EMG, EEG, etc.) and the like. As such, in some embodiments, the eye tracking components may consume power only while the LEDs and the camera are turned on (e.g., when the user is using the eye tracking features).

In some embodiments, the eye tracking features are optimized when the camera is located at the bottom of the mobile device 102 (e.g., with respect to the perspective of the user). The user may rotate the mobile device 102 coupled to the docking device 104 to properly orient the camera module 108 such that it is located at the bottom of the mobile device 102. In some embodiments, using the accelerometer and/or magnetometer of the mobile device 102, the LEDs, the pass filter, and/or the camera may be turned on and/or off depending on the orientation of the mobile device 102 and the docking device 104 (e.g., turn off the LEDs and the camera when the mobile device 102 and the docking device 104 are rotated such that the camera module 108 is located at the top of the mobile device 102 with respect to the perspective of the user).

The LEDs and the camera may be turned off when the user's face is not recognized for a predetermined amount of time (e.g., 5-10 seconds) and may turn on again when the user's face is detected and recognized.

Figure 2:
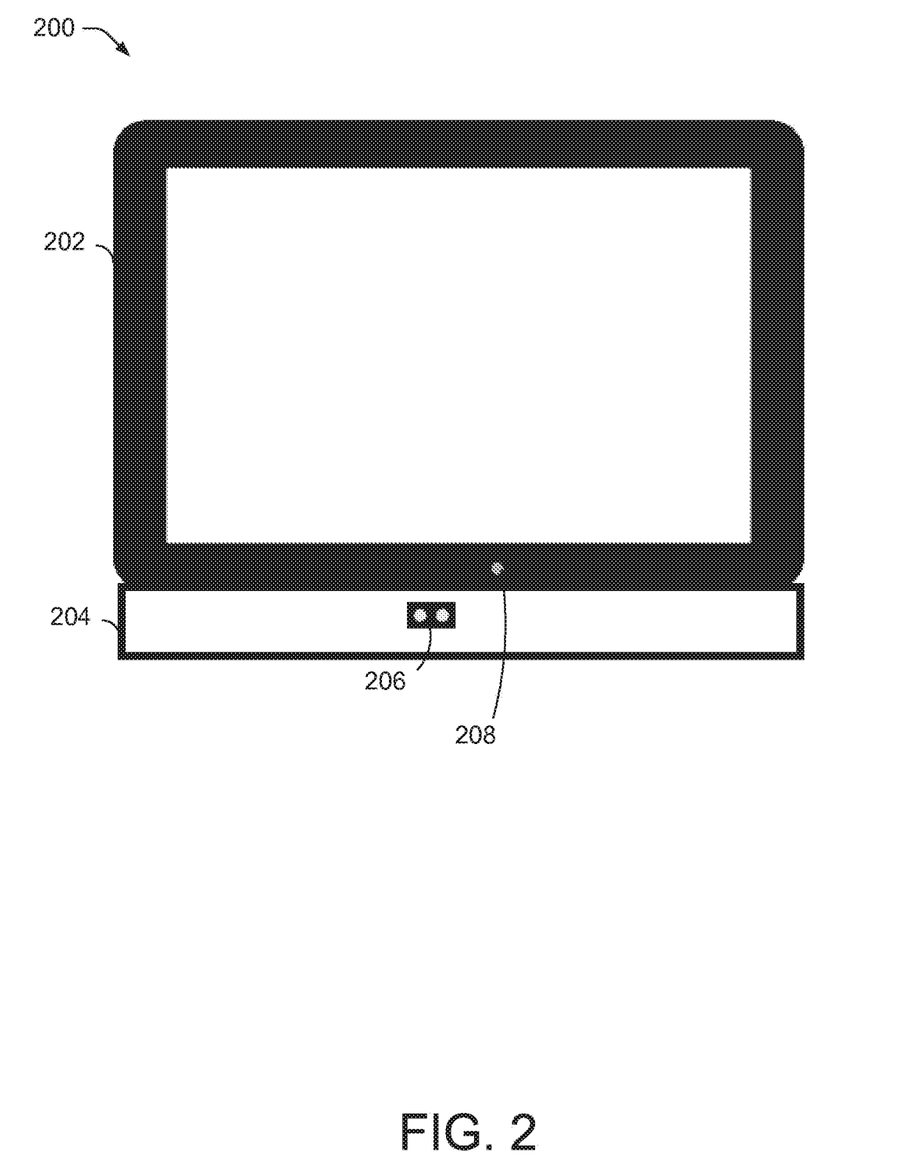
FIG. 2 is a device diagram of another example of a mobile device coupled to a docking device capable of facilitating eye tracking control, according to some embodiments.

FIG. 2 is a device diagram 200 of another example of a mobile device 202 coupled to a docking device 204 capable of facilitating eye tracking control. The example shown in FIG. 2 may operate similarly to the example shown in FIG. 1 and may incorporate any one or combination of features described for FIG. 1. However, FIG. 2 shows that the docking device 204 may be integrated with LEDs 206, and the camera module 208 of the mobile device 202 may be used (instead of the camera module being integrated with the docking device 204). In some embodiments which couple the mobile device 202 with the docking device 204 using a USB, a micro-USB port, or a proprietary port, the configuration depicted in FIG. 2 may allow for faster transfer of images from the camera since the camera of the mobile device 202 is used to capture the images. The front-facing camera for eye tracking control may be utilized while simultaneously utilizing one or more back-facing cameras.

Figure 3A:
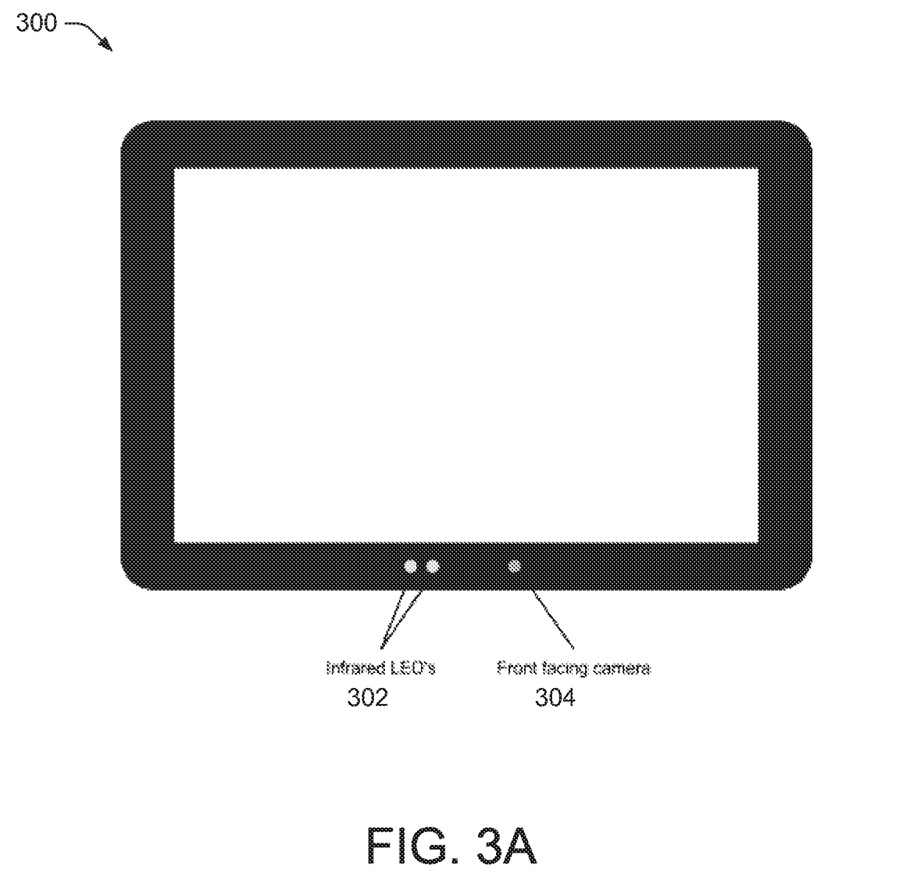
FIGS. 3A-3C are device diagrams of example mobile devices capable of facilitating eye tracking control, according to some embodiments.
Figure 3B:
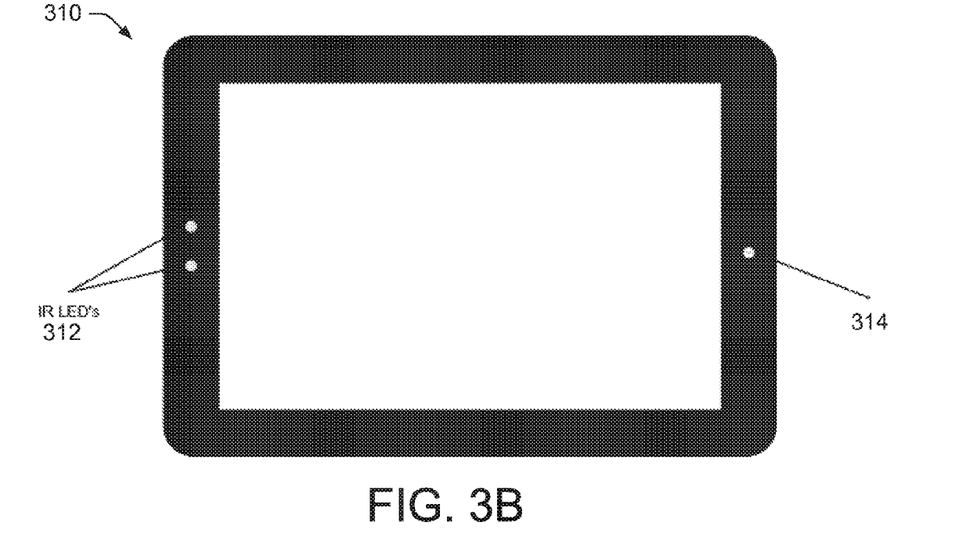
Figure 3C:
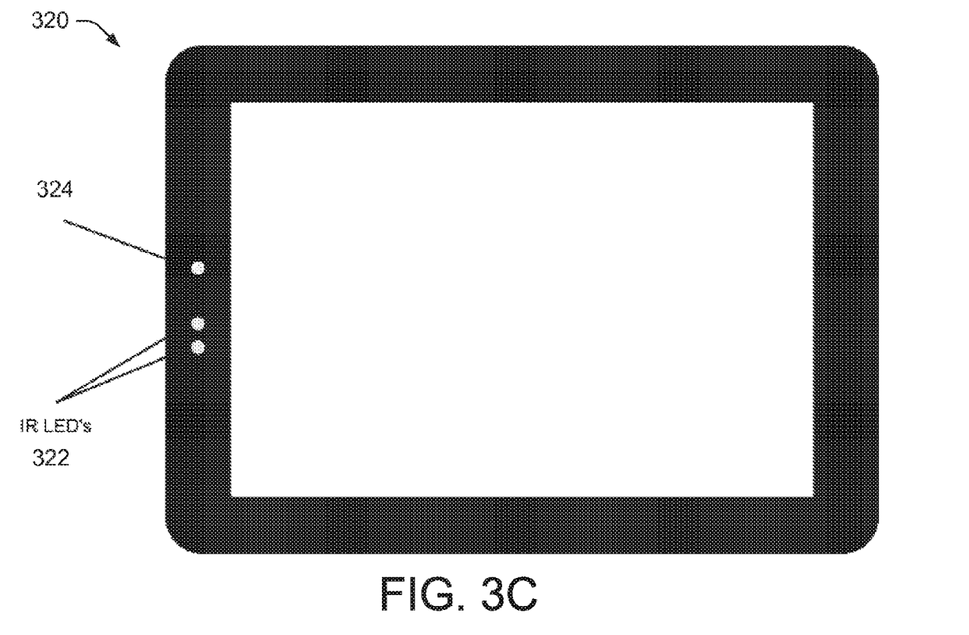

FIGS. 3A-3C are device diagrams of example mobile devices capable of facilitating eye tracking control. The examples shown in FIGS. 3A-3C may operate similarly to the example shown in FIG. 1 and may incorporate any one or combination of features described for FIG. 1. However, the LEDs and camera modules are integrated into the mobile device (instead of being part of a docking device). FIGS. 3A-3C depict mobile devices 300, 310, 320, respectively, with LEDs 302, 312, 322 and camera modules 304, 314, 324 integrated into the mobile devices 300, 310, and 320 in different example configurations (with respect to the user's perspective).

The LEDs and the camera modules on the mobile devices may be located in any one of a number of configurations on the mobile devices. FIG. 3A shows the LEDs 302 and the camera module 304 being located at the bottom of the mobile device 300. FIG. 3B shows the LEDs 312 being located on one side of the mobile device 310 while the camera module 314 is located on the opposite side of the mobile device 310. FIG. 3C shows the LEDs 302 and the camera module 304 being located on the same side of the mobile device 300.

Figure 4:
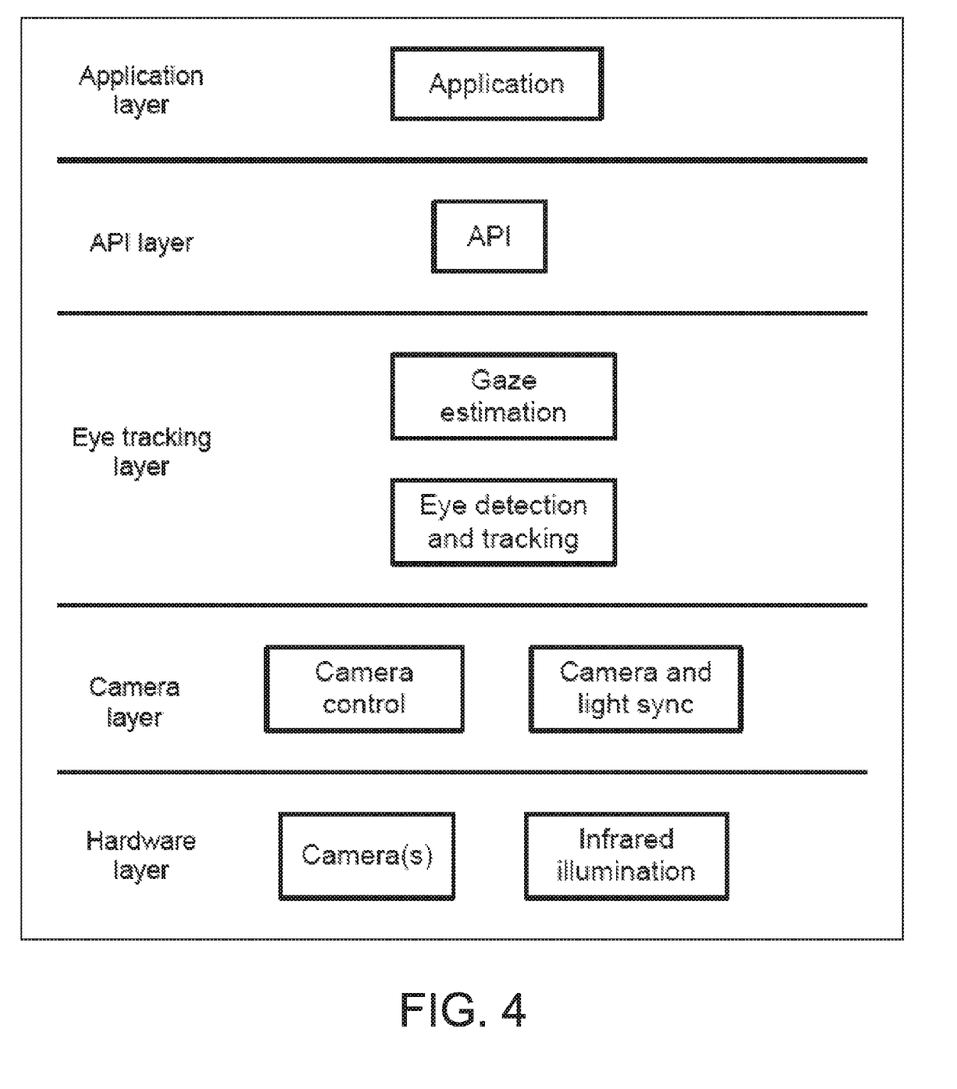
FIG. 4 is a block diagram of an example software architecture for facilitating eye tracking control, according to some embodiments.

FIG. 4 is a block diagram of an example software architecture for facilitating eye tracking control. Any one or more of the components of the software architecture may run on either a control processing unit (CPU) of the mobile device or on a combination of a CPU and a graphics processing unit (GPU) of the mobile device. In some embodiments, any one or more of the components of the software architecture may run on a dedicated chip. The software may run as a background process (e.g. as part of the operating system (OS), in a web browser, etc.) and may provide an application programming interface (API) that other applications can access. The API may fire an event or use some other similar mechanism to send the information of where the user is looking on the screen to other applications.

The software architecture may be divided into different layers. The bottom layer would correspond to the hardware (e.g. the camera(s), the infrared illumination, etc.). A camera layer may be in charge of communicating with the camera(s) in order to perform camera operations such as, for example, starting the camera, grabbing images, controlling the camera properties, and the like. This layer may also synchronize the one or more cameras and the infrared emitters so that the lights are turned on when there is an image being captured and off the rest of the time (e.g. strobing).

The camera layer may deliver images to the eye tracking layer. In the eye tracking layer, images may be processed to find features like face location, eye region location, pupil center, pupil size, location of the corneal reflections, eye corners, iris center, iris size, and the like. These features are used in the gaze estimation stage, which may be in charge of calculating the point of regard of the user, which may be the location on the display where the user is looking. The gaze estimation stage may also calculate the optical and visual axes of the user's eyes.

The API layer may be used for communication between the eye tracking layer and applications that use eye gaze information (e.g., OS API, games that employ eye gaze information, etc.). The API may send data calculated by the eye tracking layer, such as coordinates of the point of regard, three-dimensional (3-D) location of the user's eyes, pupil size, and the like. The API may also accept commands from an application to the eye tracking layer (e.g., to start and/or stop the eye tracking engine, query for specific information, etc.). An application may connect to the eye tracker's API and use eye gaze information for any suitable purpose (e.g., control an app or a game, record eye data for visual behavior studies, etc.).

Figure 5:
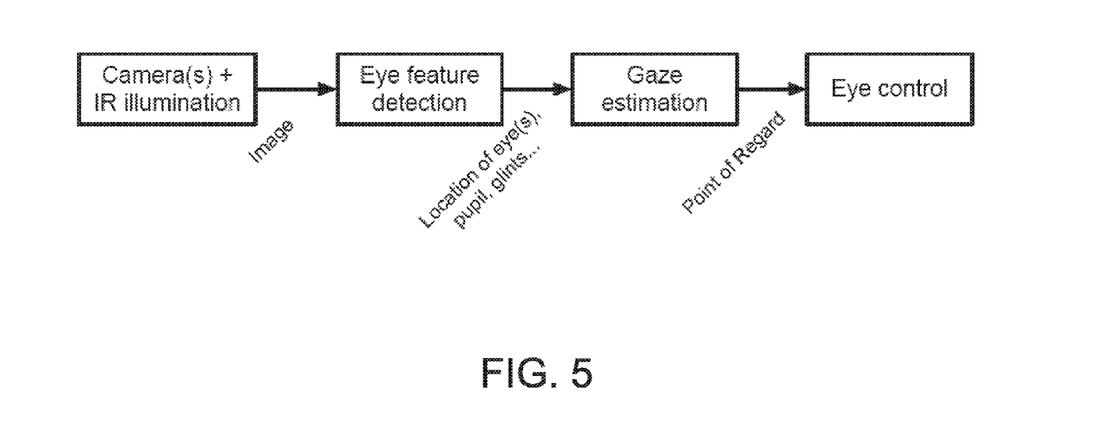
FIG. 5 is a block diagram of an example flow of data used to facilitate eye tracking control, according to some embodiments.

FIG. 5 is a block diagram of an example flow of data used to facilitate eye tracking control. The one or more cameras and the infrared LED illumination may capture an image of the user and use the captured data to detect eye features (e.g., location of eye(s), pupils, corneal reflections, etc.). Using the detected eye features, the gaze estimation module may estimate the user's point of regard, which may then be used to control aspects of an application.

A calibration process may be conducted the first time the user uses the eye tracking functionality in order to calculate personal parameters (e.g., vertical and horizontal offset between optical and visual axes). These personal parameters and the information of the face and eyes are then employed to estimate where the user is looking on the screen through a gaze estimation algorithm.

Figure 6:
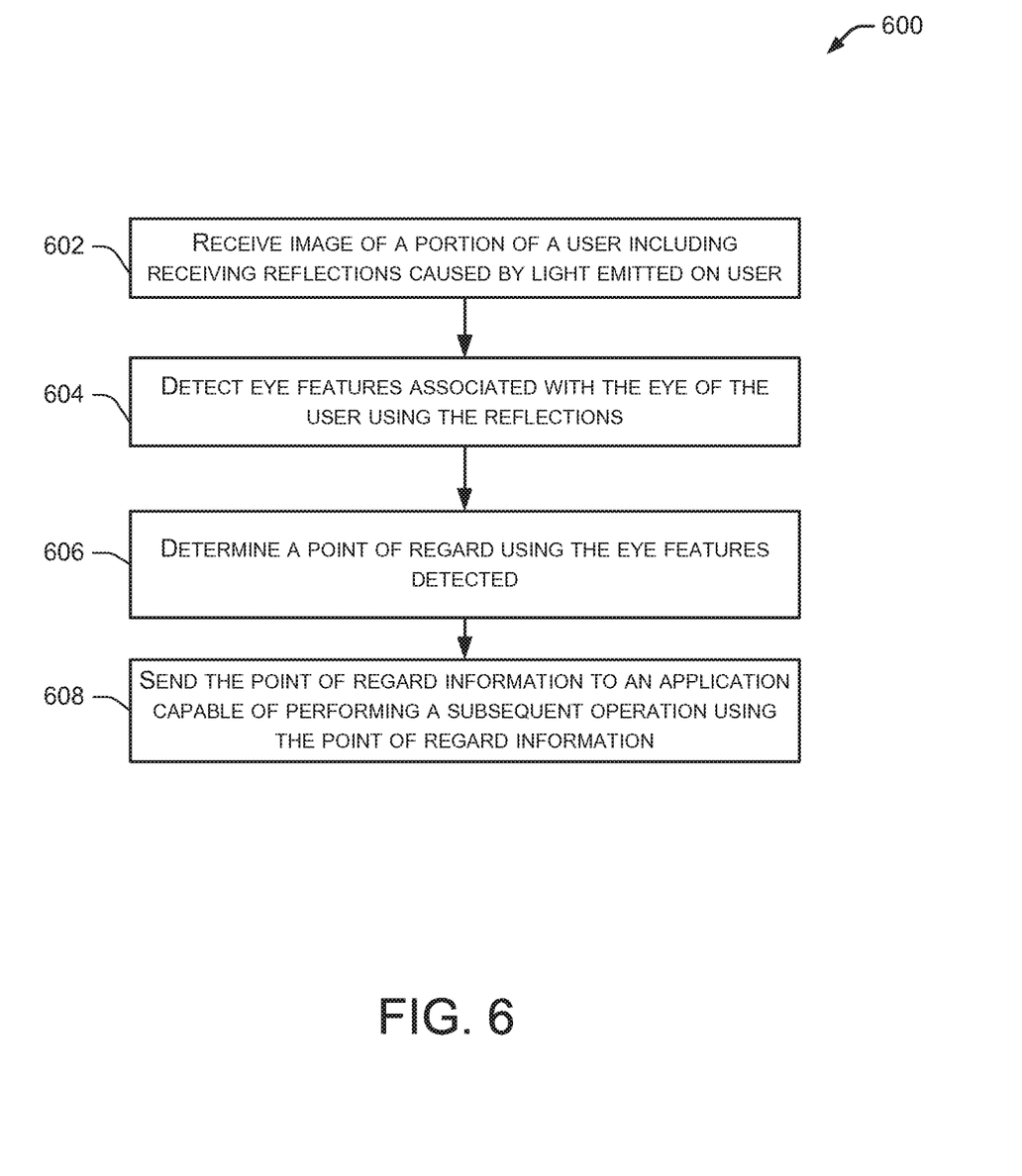
FIG. 6 is a flowchart of an example method for facilitate eye tracking control, according to some embodiments.

FIG. 6 is a flowchart of an example method 600 for facilitate eye tracking control. The method 600 may be performed using the mobile device, cameras, and LEDs in any configuration.

In operation 602, an image of a portion of a user is received at the mobile device. The image includes reflections (e.g., corneal reflections) caused by light emitted on the user.

In operation 604, eye features (e.g., pupil location, size, corneal reflection location, eye corners, iris location, etc.) of the user are detected using the reflections received.

In operation 606, a point of regard is determined for the user using the eye features detected. Optical and/or visual axes may also be determined. The determination of the point of regard may account for the location of the one or more camera and the LEDs with respect to the screen.

In operation 608, the point of regard information is sent to an application capable of using the point of regard information in a subsequent operation.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
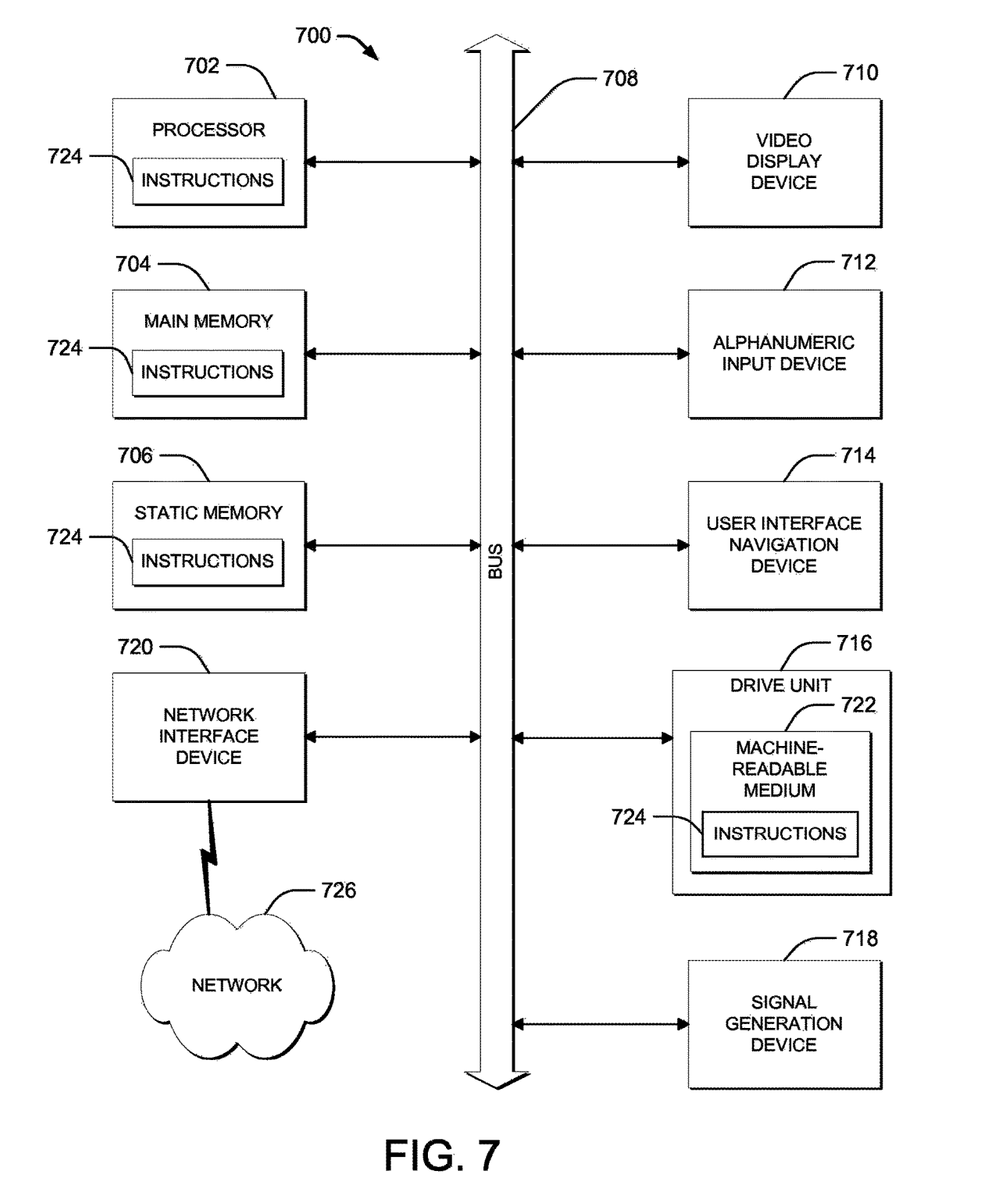
FIG. 7 is a block diagram of a machine in the example form of a computer system within which a set of instructions, for causing the machine to perform any one or more of the methodologies discussed herein, may be executed, according to some embodiments.

FIG. 7 is a block diagram of a machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    controlling, at an eye tracking device, one or more light sources located within the eye tracking device to synchronize emission of light from the one or more light sources with a timing of image capture by a camera, wherein the controlling further includes filtering the light from the light sources using an infrared (IR) pass filter that allows light within an IR passband between 800nm and 900 nm to enter the camera and prevents light outside of the IR passband from entering the camera, and wherein the camera has a field of view that overlaps with a field of emission of the one or more light sources;
    receiving, at the eye tracking device, an image of a portion of a user captured by the camera, the image including reflections caused by light emitted on the user from the one or more light sources located within the eye tracking device;
    detecting one or more eye features associated with an eye of the user using the reflections;
    determining point of regard information using the one or more eye features, the point of regard information indicating a location on a display of a computing device coupled to the eye tracking device at which the user was looking when the image of the portion of the user was taken; and
    sending the point of regard information to an application capable of performing a subsequent operation using the point of regard information,
    wherein at least one of the camera and the one or more light sources are turned off when the user is not detected for a predetermined amount of time and are turned on when the user is detected again.

2. The method of claim 1, wherein the camera is located within the eye tracking device.

3. The method of claim 1, wherein the camera has a depth of field ranging from 40 cm to 80 cm.

4. The method of claim 1, wherein the subsequent operation includes moving an object displayed on the display based on the point of regard information.

5. The method of claim 1, wherein the field of emission is approximately 30-40 degrees.

6. A non-transitory machine-readable storage medium storing instructions which, when executed by one or more processors, cause the one or more processors to perform operations comprising:
    controlling, at an eye tracking device, one or more light sources located within the eye tracking device to synchronize emission of light from the one or more light sources with a timing of image capture by a camera, wherein the controlling further includes filtering the light from the light sources using an infrared (IR) pass filter that allows light within an IR passband between 800nm and 900 nm to enter the camera and prevents light outside of the IR passband from entering the camera, and wherein the camera has a field of view that overlaps with a field of emission of the one or more light sources;
    receiving, at the eye tracking device, an image of a portion of a user captured by the camera, the image including reflections caused by light emitted on the user from the one or more light sources located within the eye tracking device;
    detecting one or more eye features associated with an eye of the user using the reflections;
    determining point of regard information using the one or more eye features, the point of regard information indicating a location on a display of a computing device coupled to the eye tracking device at which the user was looking when the image of the portion of the user was taken; and
    sending the point of regard information to an application capable of performing a subsequent operation using the point of regard information,
    wherein at least one of the camera and the one or more light sources are turned off when the user is not detected for a predetermined amount of time and are turned on when the user is detected again.

7. The non-transitory machine-readable storage medium of claim 6, wherein the camera is located within the eye tracking device.

8. The non-transitory machine-readable storage medium of claim 6, wherein the camera has a depth of field ranging from 40 cm to 80 cm.

9. The non-transitory machine-readable storage medium of claim 6, wherein the subsequent operation includes moving an object displayed on the display based on the point of regard information.

10. The non-transitory machine-readable storage medium of claim 6, wherein the field of emission is approximately 30-40 degrees.

11. An eye tracking device comprising:
    one or more light sources configured to emit light wherein the one or more light sources further comprise an infrared (IR) pass filter that allows light within an IR passband between 800 nm and 900 nm to enter the camera and prevents light outside of the IR passband from entering the camera; and one or more hardware processors in communication with the one or more light sources, the one or more hardware processors configured to:
  control the one or more light sources to synchronize emission of light from the one or more light sources with a timing of image capture by a camera, wherein the camera has a field of view that overlaps with a field of emission of the one or more light sources,
  receive an image of a portion of a user captured by the camera, the image including reflections caused by light emitted on the user from the one or more light sources,
  detect one or more eye features associated with an eye of the user including detecting the one or more eye features using the reflections,
  determine point of regard information using the one or more eye features, the point of regard information indicating a location on a display of a computing device coupled to the eye tracking device at which the user was looking when the image of the portion of the user was taken, and
  send the point of regard information to an application capable of performing a subsequent operation using the point of regard information,
  wherein at least one of the camera and the one or more light sources are turned off when the user is not detected for a predetermined amount of time and are turned on when the user is detected again.

12. The eye tracking device of claim 11, wherein the camera is located within the eye tracking device.

13. The eye tracking device of claim 11, wherein the predetermined amount of time is five seconds or greater.

14. The eye tracking device of claim 11, wherein the subsequent operation includes moving an object displayed on the display based on the point of regard information.

15. The eye tracking device of claim 11, wherein the predetermined amount of time is five seconds or greater.

16. The eye tracking device of claim 11, wherein the field of emission is approximately 30-40 degrees.

* * * * *

UNITED STATES PATENT AND TRADEMARK OFFICE
CERTIFICATE OF CORRECTION

PATENT NO. : 9,952,666 B2  Page 1 of 1
APPLICATION NO. : 15/453727
DATED : April 24, 2018
INVENTOR(S) : Sebastian Sztuk et al.

It is certified that error appears in the above-identified patent and that said Letters Patent is hereby corrected as shown below:

In the Claims

Column 9, Line 43, Claim 1 after "between" delete "800nm" and insert -- 800 nm --.
Column 10, Line 22, Claim 6 after "between" delete "800nm" and insert -- 800 nm --.
Column 10, Line 62, Claim 11 after "emit" delete "light wherein" and insert -- light, wherein --.
Column 10, Line 65, Claim 11 after "enter" delete "the" and insert -- a --.
Column 11, Line 6, Claim 11 after "by" delete "a camera" and insert -- the camera --.

Signed and Sealed this
Twentieth Day of November, 2018

Andrei Iancu
*Director of the United States Patent and Trademark Office*